US012140907B2

(12) United States Patent
Le Moal et al.

(10) Patent No.: US 12,140,907 B2
(45) Date of Patent: Nov. 12, 2024

(54) SPIRAL SPRING FOR TIMEPIECE RESONATOR MECHANISM PROVIDED WITH MEANS FOR SETTING THE EFFECTIVE LENGTH OF THE SPIRAL SPRING

(71) Applicant: Omega SA, Biel/Bienne (CH)

(72) Inventors: Romain Le Moal, Villers-le-lac (FR); Laurent Jeanneret, Villers-le-lac (FR); Pierre Cusin, Villars-Burquin (CH)

(73) Assignee: Omega SA, Biel/Bienne (CH)

( * ) Notice: Subject to any disclaimer, the term of this patent is extended or adjusted under 35 U.S.C. 154(b) by 382 days.

(21) Appl. No.: 17/517,950

(22) Filed: Nov. 3, 2021

(65) Prior Publication Data

US 2022/0171335 A1 Jun. 2, 2022

(30) Foreign Application Priority Data

Nov. 27, 2020 (EP) .................................... 20210406

(51) Int. Cl.
*G04B 17/06* (2006.01)
*G04B 17/04* (2006.01)

(52) U.S. Cl.
CPC ........... *G04B 17/06* (2013.01); *G04B 17/045* (2013.01)

(58) Field of Classification Search
CPC ..... G04B 17/06; G04B 17/045; G04B 17/066
USPC ........................................................ 368/173
See application file for complete search history.

(56) References Cited

U.S. PATENT DOCUMENTS

2014/0286143 A1* 9/2014 Stranczl ................. G04B 18/06 368/178
2016/0306324 A1 10/2016 Sarchi et al.
2018/0120769 A1* 5/2018 Helfer .................... G04B 17/26
(Continued)

FOREIGN PATENT DOCUMENTS

| | | | |
|---|---|---|---|
| CH | 76 447 | A | 12/1917 |
| CN | 104062884 | A | 9/2014 |
| CN | 104850000 | A | 8/2015 |

(Continued)

OTHER PUBLICATIONS

European Search Report issued Apr. 21, 2021 in European Application 20210406.3, filed on Nov. 27, 2020, 3 pages (with English Translation of Categories of cited documents).
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A spiral spring for a timepiece resonator mechanism, the spiral spring extending substantially in a plane and including a flexible blade wound on itself in several turns and a setting device for modifying the effective length of the wound blade, the setting device including a clamp movable along at least one ending portion of the spiral spring, the clamp extending substantially in the plane of the spiral spring, the clamp including two bearing faces arranged on either side of the wound blade in a multiplicity of positions so as to define a variable effective length of the spiral spring, the clamp and the wound blade being linked to each other by a flexible element allowing the clamp and the bearing faces to be displaced along the wound blade.

11 Claims, 2 Drawing Sheets

(56) References Cited

U.S. PATENT DOCUMENTS

| | | | | |
|---|---|---|---|---|
| 2019/0332057 | A1 * | 10/2019 | Born | G04B 43/002 |
| 2020/0292992 | A1 * | 9/2020 | Kaelin | G04B 17/325 |

FOREIGN PATENT DOCUMENTS

| | | | | | |
|---|---|---|---|---|---|
| CN | 110412854 | A | | 11/2019 | |
| CN | 111308878 | A | | 6/2020 | |
| EP | 1780611 | A2 | * | 5/2007 | G04B 17/066 |
| EP | 3 081 996 | A1 | | 10/2016 | |

OTHER PUBLICATIONS

Office Action dated Jun. 27, 2024, issued in corresponding Chinese patent application No. 202111421739.6.

* cited by examiner

SPIRAL SPRING FOR TIMEPIECE RESONATOR MECHANISM PROVIDED WITH MEANS FOR SETTING THE EFFECTIVE LENGTH OF THE SPIRAL SPRING

CROSS-REFERENCE TO RELATED APPLICATION

This application claims priority to European Patent Application No. 20210406.3 filed on Nov. 27, 2020, the entire disclosure of which is hereby incorporated herein by reference.

FIELD OF THE INVENTION

The invention relates to a spiral spring for a timepiece resonator mechanism, the spiral spring being provided with means for setting the effective length of said spiral spring. The invention also relates to a horological resonator mechanism provided with such a spiral spring.

BACKGROUND OF THE INVENTION

The quest to improve the performance of watchmaking time bases is a constant concern. A major limitation to the chronometric performance of mechanical watches lies in the use of conventional impulse escapements.

The balance spiral spring should generally be able to be set to improve the precision of a watch. To this end, means are used for setting the rigidity of the spiral spring, such as an index to adjust the effective length of the spiral. Thus, its rigidity is modified to adjust the rate precision of the watch. However, the effect of a regular index in adjusting the rate remains limited, and it is not always effective in making the setting precise enough, in the order of a few seconds or tens of seconds per day.

To improve the precision of the setting, document CH286562 describes a spiral spring provided with a clamp capable of clamping the ending portion of the spiral spring in a plurality of places, so that the effective length of the spiral spring is changed, and thus allows to set the rate of the balance. Furthermore, it is possible to rotate one or more rollers forming the clamp to select the length of the spiral spring.

However, in order to modify the position of the clamp, it is necessary to act on a part by displacing it and fastening it with a screw. This setting mode is not easy to perform, and does not allow sufficient fine tuning of the oscillator rate to be obtained.

SUMMARY OF THE INVENTION

The purpose of the present invention is to overcome all or part of the aforementioned disadvantages by proposing a spiral spring provided with efficient and precise setting means, configured in particular to set the rate of a timepiece by modifying the effective length of said spiral.

To this end, the invention relates to a spiral spring for a timepiece resonator mechanism, the spiral spring extending substantially in a plane and comprising a flexible blade wound on itself in several turns and setting means for modifying the effective length of the wound blade, the setting means including a clamp movable along at least one ending portion of the spiral spring, the clamp extending substantially in the plane of the spiral spring, the clamp comprising two bearing faces arranged on either side of the wound blade in a multiplicity of positions so as to define a variable effective length of the spiral spring.

The invention is remarkable in that the clamp and the wound blade are linked to each other by a flexible element allowing the clamp and the bearing faces to be finely displaced along the wound blade.

Efficient setting means are thus obtained allowing to modulate the effective length of the spiral spring in a controlled manner. The rate of the timepiece can thus be easily and precisely adjusted.

According to a particular embodiment of the invention, the two bearing faces are configured to bear against the wound blade.

According to a particular embodiment of the invention, the two bearing faces are configured to remain at a distance from the wound blade, the wound blade contacting the bearing faces during the operation of the spiral spring.

According to a particular embodiment of the invention, the clamp and the wound blade are made in one-piece, preferably made of silicon.

According to a particular embodiment of the invention, the wound blade comprises an ending portion, the bearing faces of the clamp being configured to displace on either side of the ending portion.

According to a particular embodiment of the invention, the ending portion includes a variable width to modify its rigidity, and thus the sensitivity of the rate setting.

According to a particular embodiment of the invention, the clamp comprises two branches extending on either side of the ending portion of the spiral spring, the end of each branch including one of said bearing faces.

According to a particular embodiment of the invention, the flexible element comprises at least two flexible blades linked, on the one hand, to the branches, and on the other hand, to the ending portion of the wound blade.

According to a particular embodiment of the invention, the flexible blades are substantially perpendicular to the ending portion in the rest position of the flexible element.

According to a particular embodiment of the invention, the flexible blades partially surround the ending portion.

According to a particular embodiment of the invention, the clamp comprises a rigid member and two movable bodies each including one of said bearing faces.

According to a particular embodiment of the invention, the flexible element comprises at least two flexible blades to connect each movable body to the rigid member.

According to a particular embodiment of the invention, the flexible element comprises a translation platform linked, on the one hand, to the clamp, and on the other hand, to the ending portion.

According to a particular embodiment of the invention, the translation platform comprises at least one secondary flexible blade, preferably two flexible blades, and a rigid portion, the secondary flexible blade(s) being joined to the rigid portion, and to the rigid member, the ending portion of the wound blade being joined to the rigid portion.

According to a particular embodiment of the invention, the flexible element comprises two springs each linked, on the one hand, to the rigid portion of the translation platform, and on the other hand, to each movable body.

Furthermore, the invention relates to a resonator for a timepiece comprising a balance, characterised in that it includes a spiral spring according to the invention.

BRIEF DESCRIPTION OF THE DRAWINGS

Other features and advantages will emerge clearly from the description which is given below, by way of indication and in no way limiting, with reference to the appended drawings, wherein.

DETAILED DESCRIPTION OF THE PREFERRED EMBODIMENTS

Figure 1:
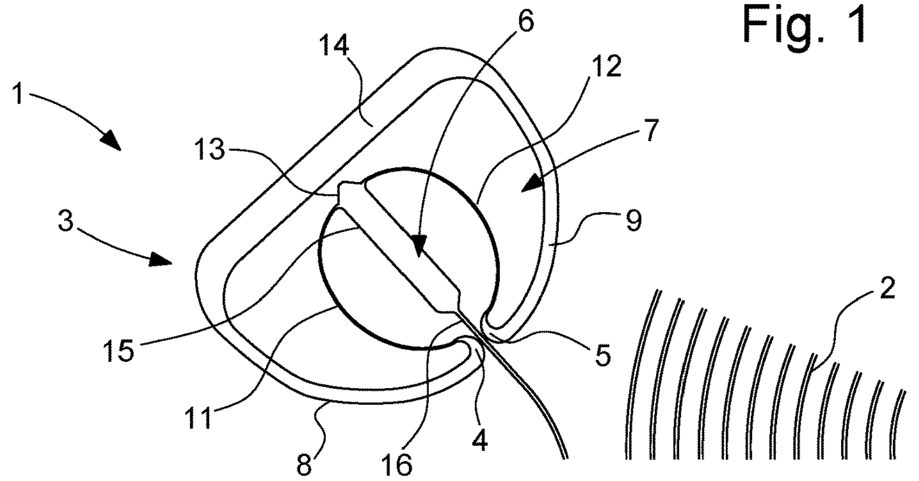
FIG. 1 is a representation of a spiral spring provided with setting means according to a first embodiment of the invention.
Figure 2:
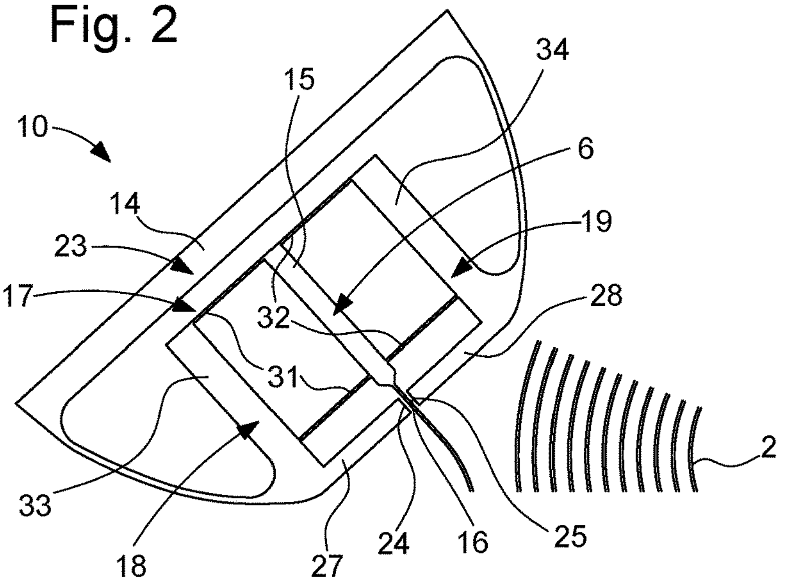
FIG. 2 is a representation of a spiral spring provided with setting means according to a second embodiment of the invention.
Figure 3:
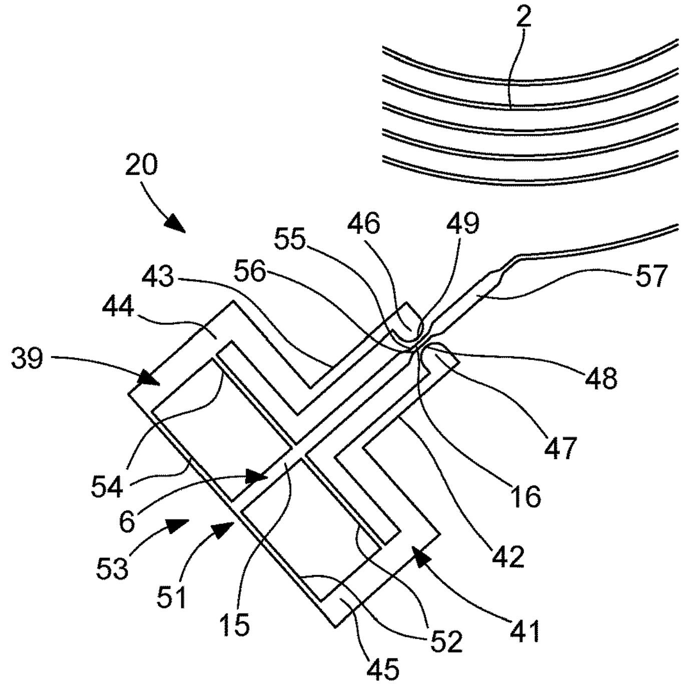
FIG. 3 is a representation of a spiral spring provided with setting means according to a third embodiment of the invention.
Figure 4:
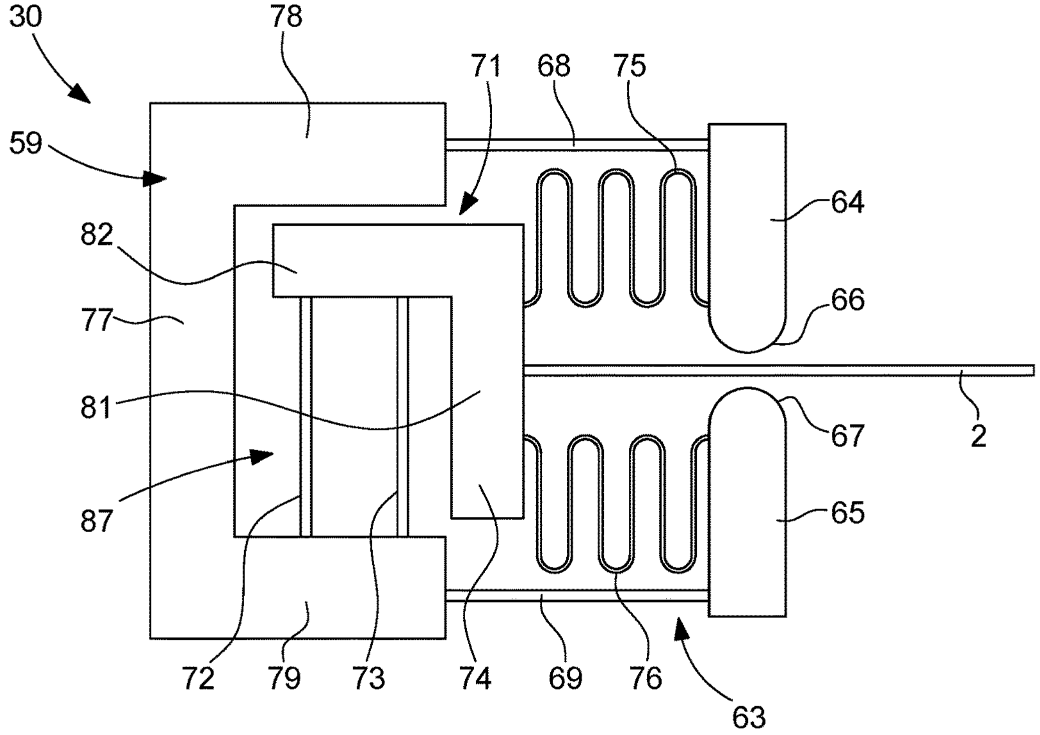
FIG. 4 is a representation of setting means for a spiral spring according to a fourth embodiment of the invention.
Figure 5:
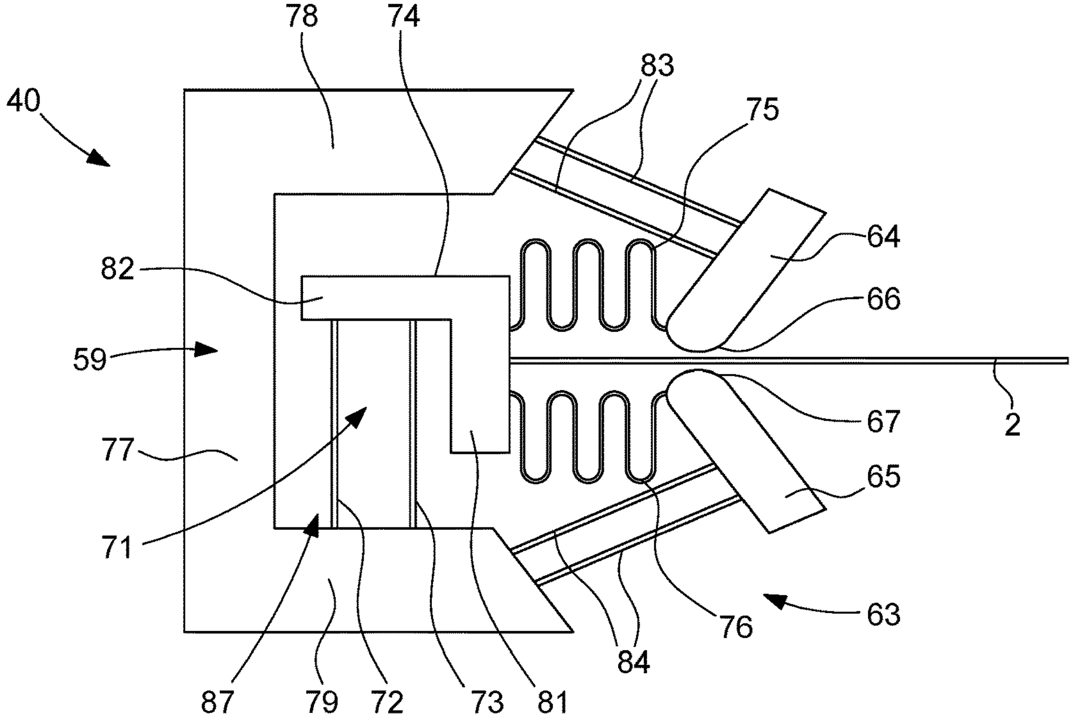
FIG. 5 is a representation of setting means for a spiral spring according to a fifth embodiment of the invention.

In FIGS. 1 to 5, the invention relates to different embodiments of a spiral spring 1, 10, 20, 30, 40 for a resonator timepiece mechanism. A resonator mechanism comprises a balance, generally circular, the oscillation frequency of which is determined in particular by the spiral spring 1, 10, 20, 30, 40. The spiral spring 1, 10, 20, 30, 40 extends substantially in a plane and includes a flexible wound blade 2 wound on itself in several turns, which preferably extend in the same plane. The wound blade 2 of the spiral spring 1, 10, 20, 30, 40 includes an ending portion 6, which is preferably substantially straight. In the embodiments of FIGS. 1 to 3, the ending portion 6 comprises a rigid portion 15 forming the end of the ending portion 6 and a thin portion 16 preceding the rigid portion 15. Preferably, the rigid portion 15 is fastened to the movement to prevent the ending portion 6 from displacing. The thin portion 16 is at least partly embedded into the thick rigid portion 15. In the embodiment of FIGS. 4 and 5, the ending portion 6 does not comprise a rigid portion.

To modify the frequency of oscillation of the resonator, the spiral spring 1, 10, 20, 30, 40 comprises setting means allowing to modify the effective length of said spiral spring 1. Thus, the length of the spring can be adapted to adjust as best as possible the rate of the resonator. The setting means include a clamp 3, 33, 53, 63 which can be displaced along at least part of the spiral. Preferably, the clamp 3, 33, 53, 63 extends substantially in the same plane as the spiral spring 1, 10, 20, 30, 40. Preferably, the clamp 3, 33, 53, 63 and the wound blade 2 are made in one-piece. In other words, they are made of the same material, for example silicon The clamp 3, 33, 53, 63 comprises two bearing faces 4, 5, 24, 25, 48, 49, 66, 67 configured to bear on either side of the wound blade 2 in a multiplicity of positions depending on the setting. Thus, the clamp 3, 33, 53, 63 allows to define a variable effective length of the spiral spring 1, 10, 20, 30, 40 depending on its position on the flexible wound blade. The bearing faces 4, 5, 24, 25, 48, 49, 66, 67 are for example in contact with the ending portion 6 of the wound blade 2, and can be displaced along this ending portion 6, in particular of the thin portion 16.

According to the invention, the clamp 3, 33, 53, 63 and the wound blade 2 are assembled to each other by a flexible element 7, 17, 51, 87. The flexible element 7, 17, 51, 87 is configured to be pressed in order to allow the displacement of the bearing faces 4, 5, 24, 25, 48, 49, 66, 67 along the ending portion 6 of the wound blade 2. The pressure is performed in a direction substantially parallel, or even collinear, to the ending portion 6 of the wound blade 2. By applying a force to the flexible element 7, 17, 51, 87, the clamp 3, 33, 53, 63 displaces and changes position on the ending portion 6. Furthermore, by adapting the dimensions of the clamp, the intensity of the pressing force can be modulated.

The clamp 3, 33, 53, 63 and the wound blade 2 are connected in two ways. A first connection is a stationary link, the wound blade and the clamp each being assembled to the flexible element 7, 17, 51, 87. A second connection is a movable link formed between the bearing faces 4, 5 and the wound blade 2. This movable link can be displaced along the ending portion 6 to select the effective length of the wound blade. Thus, the stationary link is a different connection of the bearing faces and the wound blade which form a movable link.

In order to be able to exert a pressure force on the clamp 3, 33, 53, 63, use is made of application means, not shown in the figures. The application means are for example a lever, a screw oriented longitudinally towards the clamp, or an eccentric screw whose head is placed against the clamp 3, 33, 53, 63.

In the first embodiment of FIG. 1, the clamp 3 comprises two branches 8, 9 extending on either side of the wound blade 2 of the spiral spring 1. The branches 8, 9 are preferably flexible, one end of each branch 8, 9 including one of the bearing faces 4, 5. The branches 8, 9 have the shape of an arc of a circle ending in a curved bearing face 4, 5. The branches 8, 9 are configured so that the two bearing faces 4, 5 are in contact on both sides of the wound blade 2. Thus the ending portion 6 of the wound blade passes between the two bearing faces 4, 5.

The clamp 3 comprises at least two flexible blades 11, 12 linked, on the one hand, to the branches 8, 9, and on the other hand, to the ending portion 8 of the wound blade 2. The flexible blades 11, 12 allow the branches 8, 9 to displace relative to the ending portion 6 of the wound blade 2. The flexible blades 11, 12 are arranged on either side of the ending portion 6. The flexible blades 11, 12 are curved so as to be able to extend or contract when the clamp 3 displaces along the ending portion 6. The curvature of the flexible blades 11, 12 is directed towards the branches 8, 9 and are arranged in the plane of the spiral spring 1. Thus, the flexible blades 11, 12 partially surround the ending portion 2.

Depending on the positions of the clamp 3, the bearing faces 4, 5 are in contact in different positions of the thin portion 16. The flexible blades 11, 12 are assembled, on the one hand, to the free end 13 of the ending portion 6, in particular of the rigid portion, and on the other hand, to the end of the branches 8, 9, that is to say at the bearing faces 4, 5.

Thus, when the clamp 3 is pushed, the flexible element 7 stretches, and when the pressing force is withdrawn, the flexible element 7 retracts to its initial state. In the embodiment of FIG. 1, the curvature of the flexible blades 11, 12 increases or decreases.

The clamp 3 comprises a rigid longitudinal member 14 arranged substantially perpendicular to the ending portion 6, and to which the force is applied by the application means mentioned above. The branches 8, 9 are connected to the ends of the rigid member 14. Thus, when the rigid member 14 is pressed by the application means, the branches 8, 9 move forward or backward, so that the contact faces 4, 5 displace along the ending portion 8. The member 14 is arranged at a distance from the rigid portion 15 to allow the member 14 to move closer and away from the rigid portion 15 when the flexible element 7 is pressed.

In the second embodiment of a spiral spring 10 of FIG. 2, the clamp 23 comprises branches 18, 19 in the shape of an inverted L, and are preferably rigid. The branches 18, 19 are connected to each end of a rigid member 14 by a rigid rod 29, 31 in the shape of an arc, each rod, 22 starting from the corner of the L. The curvature of the arcs of the rods is directed towards the exterior of the clamp 23. The rigid member 14 is substantially perpendicular to the ending portion 6 of the wound blade 2. Each L-shaped branch 18, 19 includes a large segment 33, 34 and a small segment 27, 28 which are substantially perpendicular. The ends of the small segments 27, 28 of the L form the two bearing faces 24, 25 between which passes the ending portion 6 of the wound blade 2.

The two branches 18, 19 are linked to the rigid portion 15 forming the end of the ending portion 6 of the wound blade 2 by means of two pairs 31, 32 of parallel flexible blades forming the elastic element 17 of the clamp 23. Each pair 31, 32 of flexible blades is assembled, on the one hand, inside the large segment 33, 34 of the L, and on the other hand, to the rigid portion 15 of the ending portion 6. The pairs 31, 32 are arranged, preferably, symmetrically relative to the ending portion 6, the blades being substantially perpendicular to the rigid portion 15. The thin portion 16 of the ending portion 6 passes between the small segments 27, 28 of the L, which are substantially perpendicular to the ending portion 6. The rigid portion 15 of the ending portion 6 extends between the two large segments 33, 34 of the L. The rigid portion 15 and the two large segments 33, 34 of the L being substantially parallel. The rigid member 14 is substantially perpendicular to the large segments 33, 34 of the L and of the rigid portion 15 of the ending portion 6. Thus, when the rigid member 14 is pushed, the clamp displaces along the ending portion 6, thanks to the pairs 31, 32 of flexible blades which tilt.

For the third embodiment of the spiral spring 20, the branches 39, 41 of the clamp 33 have the shape of a staircase each comprising two levels, a first 42, 43 and a second 44, 45 level linked by a section 46 substantially perpendicular to the two levels. The first levels 42, 43 of each branch 39, 41 are substantially parallel and the second levels 44, 45 of each branch 39, 41 are substantially parallel.

The first levels 42, 43 of each branch 39, 41 are closer to each other, and preferably flexible, while the second levels 44, 45 of each branch 39, 41 are further apart, and preferably rigid. The free end of each first level 42, 43 comprises a protuberance 46, 47 carrying a bearing face 48, 49, the protuberance 46, 47 extending perpendicularly to the second level 44, 45 towards the ending portion 6 of the wound blade 2. The ending portion 6 extends between the two branches 39, 41 of the clamp 20, that is to say between the protuberances 46, 47, and between the first 42, 43 and second levels 44, 45. The ending portion 6 comprises a thin short portion 16 to allow the protuberances 46, 47 to be inserted into cavities 55, 56 in the base position of the setting means. To set the effective length of the spiral spring, the branches 39, 41 are pushed so that the protuberances 46, 47 come out of their cavity, and are in contact with a thicker portion 57 of the ending portion 6. The branches 39, 41 deviate from the ending portion 6.

The flexible element 51 comprises two pairs 52, 54 of parallel flexible blades. Each pair 52, 54 is joined, on the one hand, to the second level of each branch 39, 41, as well as to the rigid portion 16 of the ending portion 6. The blades of the same pair 52, 54 are substantially parallel, the two pairs 52, 54 being symmetrical relative to the rigid portion 15 of the ending portion 6. In this embodiment, there is no rigid member perpendicular to the ending portion 6 on which a force is to be applied. A force is applied to the second levels 44, 45, the force being substantially collinear with the second levels 44, 45 to slide the clamp 3 along the ending portion 6, and as well as the protuberances 46, 47 come out of their cavity 55, 56.

The fourth and fifth embodiments of the spiral spring 30, 40 describe a clamp 63 comprising a rigid member 59 and two movable bodies 64, 65 carrying bearing faces 66, 67. The movable bodies 64, 65 have an oblong shape extending towards the ending portion 6. The clamp 63 comprises at least one flexible blade 68, 69, 83, 84 for connecting each movable body 64, 65 to the rigid member 59. The rigid member 59 has a U shape comprising a base segment 77 and two parallel segments 78, 79. The interior of the U is oriented towards the movable bodies 64, 65. The ends of the parallel segments 78, 79 are straight and the flexible blades are substantially straight. The flexible blades 68, 69 are arranged at the end of each parallel segment 78, 79, on the one hand, and on the movable body 64, 65, on the other hand. In the fourth embodiment, the two flexible blades 68, 69 are substantially collinear with the parallel segments 78, 79 in the rest position, while the four flexible blades 83, 84 of the fifth embodiment are oblique towards the ending portion 6.

The flexible element 62 comprises a translation platform 71 linked, on the one hand, to the rigid member 59, and on the other hand to the flexible wound blade 2 of the spiral spring 30. The translation platform 71 comprises at least one secondary flexible blade, preferably two secondary flexible blades 72, 73, and a rigid portion 74, the secondary flexible blade(s) 72, 73 being joined by one end to the rigid portion 74, and by another end, to the rigid member 59. The secondary flexible blades 72, 73 are joined inside a parallel segment 79. The rigid portion 74 forms an elbow, here a right angle elbow, the elbow including two segments 81, 82 which are substantially perpendicular. The ending portion 6 of the wound blade is joined to the first segment 81, while the secondary blades 72, 73 are joined to the second segment 82. Thus, the ending portion 6 is substantially perpendicular to the secondary flexible blade(s) 72, 73 of the translation platform 71. Furthermore, the clamp 61 comprises two springs 75, 76 each fastened, on the one hand, to the rigid portion 74 of the translation platform 71, and on the other hand, to a different movable body 64, 65.

Thus, when a force is applied to the rigid member 59, the movable bodies 64, 65 displace along the ending portion 6. The translation platform 71 allows the position of the ending portion 6 to be maintained substantially unchanged.

Of course, the invention is not limited to the embodiments described with reference to the figures and variants could be considered without departing from the scope of the invention. The described embodiments show clamps whose bearing faces contact the wound blade. According to possible alternative embodiments, the bearing faces remain at a distance from the wound blade, the wound blade contacting the bearing faces during the operation of the resonator mechanism.

The invention claimed is:

1. A spiral spring for a timepiece resonator mechanism, the spiral spring extending substantially in a plane and comprising a flexible blade wound on itself in several turns and setting means for modifying the effective length of the wound blade, the setting means comprising a clamp movable along at least one ending portion of the wound blade, the clamp extending substantially in the plane of the spiral spring, the clamp comprising two bearing faces arranged on either side of the wound blade in a multiplicity of positions so as to define a variable effective length of the spiral spring, wherein the clamp and the wound blade are linked to each other by a flexible element allowing the clamp and the bearing faces to be displaced along the wound blade, wherein the bearing faces are configured to bear on either side of the ending portion, wherein the clamp comprises two branches extending on either side of the ending portion of the wound blade, the end of each branch including one of said bearing faces, and wherein the flexible element comprises at least two flexible blades linked to the branches, and to the ending portion of the wound blade.

2. The spiral spring according to claim 1, wherein the clamp and the wound blade are made in one-piece.

3. The spiral spring according to claim 1, wherein the flexible blades are substantially perpendicular to the ending portion in the rest position of the flexible element.

4. The spiral spring according to claim 1, wherein the flexible blades partially surround the ending portion.

5. A spiral spring for a timepiece resonator mechanism, the spiral spring extending substantially in a plane and comprising a flexible blade wound on itself in several turns and setting means for modifying the effective length of the wound blade, the setting means comprising a clamp movable along at least one ending portion of the wound blade, the clamp extending substantially in the plane of the spiral spring, the clamp comprising two bearing faces arranged on either side of the wound blade in a multiplicity of positions so as to define a variable effective length of the spiral spring, wherein the clamp and the wound blade are linked to each other by a flexible element allowing the clamp and the bearing faces to be displaced along the wound blade, wherein the bearing faces are configured to bear on either side of the ending portion, wherein the clamp comprises a rigid member and two movable bodies each including one of said bearing faces, and wherein the flexible element comprises a translation platform linked to the clamp, and to the ending portion.

6. The spiral spring according to claim 5, wherein the flexible element comprises at least two flexible blades to connect each movable body to the rigid member.

7. The spiral spring according to claim 5, wherein the translation platform comprises at least one secondary flexible blade, and a rigid portion, the secondary flexible blade (s) being joined to the rigid portion, and to the rigid member, the ending portion of the wound blade being joined to the rigid portion.

8. The spiral spring according to claim 7, wherein the flexible element comprises two springs each linked to the rigid portion of the translation platform, and to each movable body.

9. The spiral spring according to claim 1, wherein the bearing faces are configured to bear against the wound blade.

10. The spiral spring according to claim 1, wherein the bearing faces are configured to remain at a distance from the wound blade.

11. A timepiece resonator mechanism comprising a balance, wherein said timepiece resonator comprises the balance spring according to claim 1.

* * * * *